(12) United States Patent
Peng et al.

(10) Patent No.: US 8,369,077 B2
(45) Date of Patent: Feb. 5, 2013

(54) MOUNTING APPARATUS FOR DATA STORAGE DEVICE

(75) Inventors: Wen-Tang Peng, Taipei Hsien (TW); Xin-Hu Gong, Shenzhen (CN); Gao-Liang Xia, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 595 days.

(21) Appl. No.: 12/616,069

(22) Filed: Nov. 10, 2009

(65) Prior Publication Data

US 2011/0049319 A1 Mar. 3, 2011

(30) Foreign Application Priority Data

Aug. 28, 2009 (CN) .......................... 2009 1 0306308

(51) Int. Cl.
*G06F 1/16* (2006.01)
*G12B 9/00* (2006.01)
(52) U.S. Cl. .................. 361/679.33; 248/27.1
(58) Field of Classification Search ............. 361/679.31, 361/679.32, 679.33, 679.34, 679.35, 679.36, 361/679.37, 679.38, 679.39, 679.58; 248/27.1, 248/27.3
See application file for complete search history.

(56) References Cited

U.S. PATENT DOCUMENTS

| | | | |
|---|---|---|---|
| 4,982,303 A * | 1/1991 | Krenz ............................ | 360/137 |
| 6,058,016 A * | 5/2000 | Anderson et al. ............. | 361/727 |
| 6,193,339 B1 * | 2/2001 | Behl et al. .................. | 312/223.2 |
| 6,288,902 B1 * | 9/2001 | Kim et al. ..................... | 361/725 |
| 6,378,965 B1 * | 4/2002 | Reznikov et al. .......... | 312/332.1 |
| 6,560,098 B1 * | 5/2003 | Beinor et al. ............. | 361/679.39 |
| 6,603,657 B2 * | 8/2003 | Tanzer et al. ............. | 361/679.33 |
| 6,661,651 B1 * | 12/2003 | Tanzer et al. ............. | 361/679.33 |
| 6,683,785 B1 * | 1/2004 | Chen ........................ | 361/679.33 |
| 6,798,650 B2 * | 9/2004 | Reznikov et al. ........ | 361/679.33 |
| 6,826,056 B2 * | 11/2004 | Tsuyuki et al. ............... | 361/725 |
| 6,876,547 B2 * | 4/2005 | McAlister ................ | 361/679.33 |
| 7,072,177 B2 * | 7/2006 | Peng et al. ............. | 361/679.33 |
| 7,254,017 B2 * | 8/2007 | Peng et al. ............. | 361/679.33 |
| 7,303,170 B2 * | 12/2007 | Fan et al. ..................... | 248/27.3 |
| 7,321,489 B2 * | 1/2008 | McAlister ............... | 361/679.33 |
| 7,327,565 B2 * | 2/2008 | Chen et al. .............. | 361/679.33 |
| 7,428,147 B2 * | 9/2008 | Lin .......................... | 361/679.33 |
| 7,450,375 B2 * | 11/2008 | Xu ........................... | 361/679.33 |
| 7,492,586 B2 * | 2/2009 | Peng et al. ............. | 361/679.33 |
| 7,495,902 B2 * | 2/2009 | Connelly et al. ......... | 361/679.35 |
| 7,495,908 B2 * | 2/2009 | Zhang et al. ............. | 361/679.33 |
| 7,511,953 B2 * | 3/2009 | Tao et al. ................. | 361/679.39 |
| 7,542,281 B2 * | 6/2009 | Liang et al. ............. | 361/679.39 |
| 7,609,511 B2 * | 10/2009 | Peng et al. ............. | 361/679.37 |
| 7,611,100 B2 * | 11/2009 | Peng et al. .................. | 248/27.1 |
| 7,684,181 B2 * | 3/2010 | Peng et al. ............. | 361/679.33 |
| 7,684,182 B2 * | 3/2010 | Zhang et al. ............. | 361/679.33 |
| 7,684,213 B2 * | 3/2010 | Titus ............................. | 361/818 |
| 7,697,277 B1 * | 4/2010 | Olesiewicz et al. ...... | 361/679.34 |
| 7,729,110 B2 * | 6/2010 | Zhang et al. ............. | 361/679.33 |
| 7,791,871 B2 * | 9/2010 | Peng et al. ............. | 361/679.33 |

(Continued)

*Primary Examiner* — Kimberly Wood
(74) *Attorney, Agent, or Firm* — Altis Law Group, Inc.

(57) ABSTRACT

A mounting apparatus is provided to hold a data storage device including opposite sidewalls. The mounting apparatus includes a fixing board fixed to one of the sidewalls, an installing member, and a resilient member mounted to the installing member. A mounting portion extends from an end of the fixing board. The installing member defines a receiving space. The mounting portion is received in the receiving space, and slidably mounted to the installing member. The resilient member elastically resists against the mounting portion.

17 Claims, 4 Drawing Sheets

U.S. PATENT DOCUMENTS

| | | | |
|---|---|---|---|
| 7,835,148 B2 * | 11/2010 | Tu | 361/679.39 |
| 7,864,522 B1 * | 1/2011 | Peng et al. | 361/679.33 |
| 7,881,052 B2 * | 2/2011 | Crippen et al. | 361/679.37 |
| 7,944,687 B2 * | 5/2011 | Walker et al. | 361/679.37 |
| 7,974,088 B2 * | 7/2011 | Li | 361/679.37 |
| 8,009,425 B2 * | 8/2011 | Kang | 361/679.58 |
| 8,023,263 B2 * | 9/2011 | Crippen et al. | 361/679.58 |
| 2004/0095716 A1 * | 5/2004 | McAlister | 361/685 |
| 2006/0067042 A1 * | 3/2006 | Salinas et al. | 361/685 |
| 2007/0211422 A1 * | 9/2007 | Liu et al. | 361/685 |
| 2008/0278856 A1 * | 11/2008 | Peng et al. | 360/244.3 |
| 2011/0085291 A1 * | 4/2011 | Lin et al. | 361/679.33 |
| 2011/0175501 A1 * | 7/2011 | Peng et al. | 312/223.1 |

* cited by examiner

MOUNTING APPARATUS FOR DATA STORAGE DEVICE

BACKGROUND

1. Technical Field

The disclosure relates to mounting apparatuses for data storage devices, and particularly to a mounting apparatus for absorbing vibration of data storage devices mounted to the mounting apparatus.

2. Description of Related Art

Generally speaking, a bracket is mounted in a computer enclosure, to which a plurality of data storage devices will be attached. During use of the computer, the storage devices vibrate and make noise when accessed. Moreover, the vibrations may cause the storage devices to knock against the bracket, which will harm the data storage devices.

DETAILED DESCRIPTION

Figure 1:
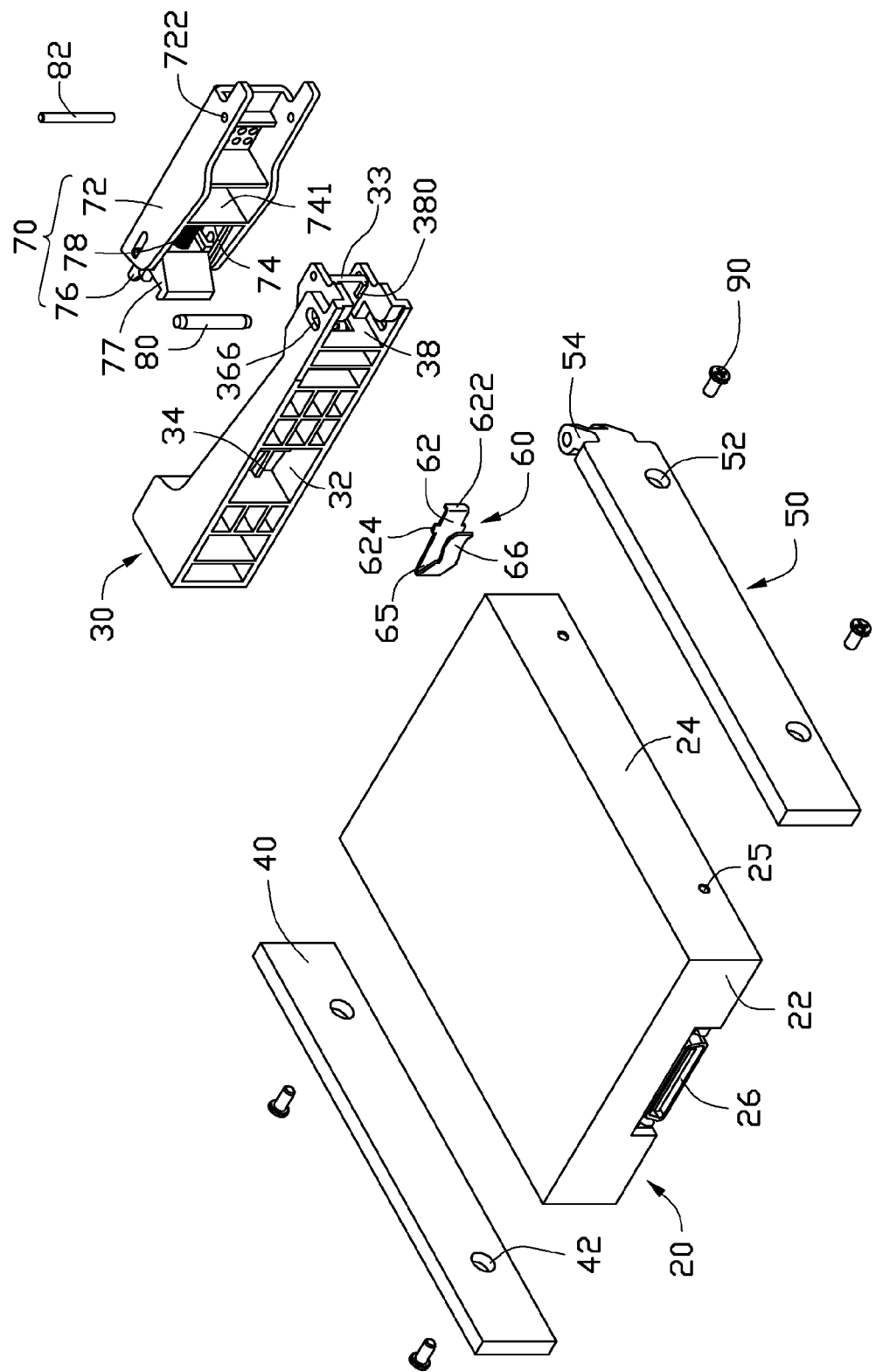
FIG. 1 is an exploded, isometric view of an exemplary embodiment of a mounting apparatus, together with a data storage device.
Figure 2:
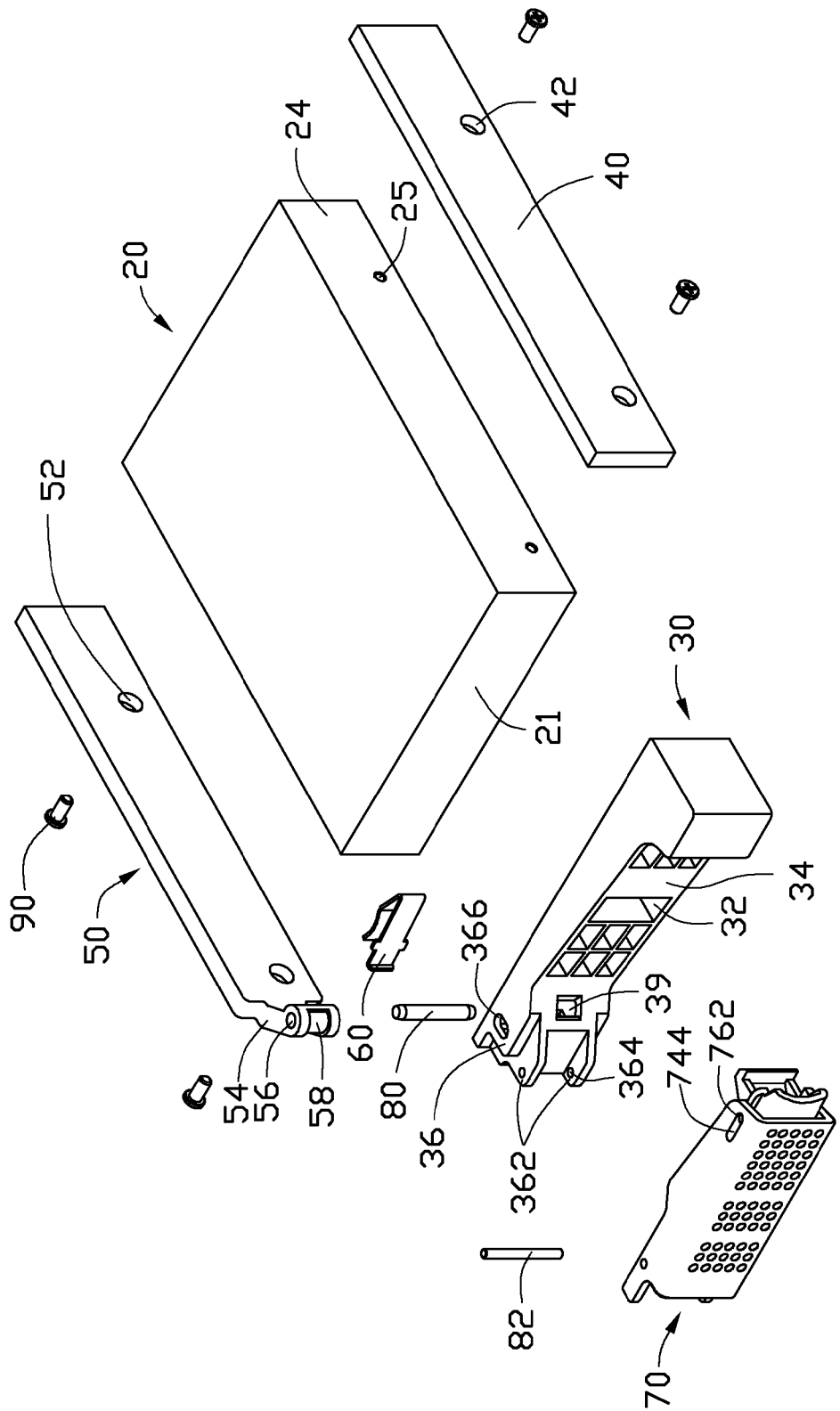
FIG. 2 is similar to FIG. 1, but viewed from another perspective.

Referring to FIGS. 1 and 2, an exemplary embodiment of a mounting apparatus is provided to fix a data storage device 20, such as a hard disk drive. The data storage device 20 includes two opposite sidewalls 24, a front wall 21 and a rear wall 22 connected to front and rear ends of the two sidewalls 24. Each sidewall 24 defines a plurality of fixing holes 25. The rear wall 22 includes an interface 26.

The mounting apparatus 10 includes an installing member 30, a positioning board 40, a fixing board 50, a resilient member 60, and a latching member 70.

The installing member 30 includes a connecting portion 36 at a first end of the installing member 30. A slot 32 is defined in a first side of the installing member 30 facing the front wall 21 of the data storage device 20, adjacent to a second end of the installing member 30 away from the connecting portion 36. A clamping block 34 extends into the slot 32 from a bottom of the slot 32. The connecting portion 36 defines a receiving space 38 facing the front wall 21 of the data storage device 20. Two protrusions 380 extend into the receiving space 38 from a resisting side 33 of the receiving space 38 facing the data storage device 20. A top wall and a bottom wall of the receiving space 38 each define a sliding hole 366 having a double-D shape. Two opposite fixing tabs 362 extend from an outer side of the resisting side 33, away from the data storage device 20. Each fixing tab 362 defines a fixing hole 364. An outer side of the connecting portion 36 opposite to the data storage device 20 defines a receiving hole 39, extending to communicate with the receiving space 38.

The positioning board 40 defines a plurality of fixing holes 42.

The fixing board 50 defines a plurality of fixing holes 52. A column-shaped mounting portion 54 extends from one end of the fixing board 50. The mounting portion 54 axially defines a fixing hole 56, and a depressed region 58 is defined in a circumference of the mounting portion 54, opposite to the fixing board 50.

The resilient member 60 includes a V-shaped fixing portion 65, a positioning portion 62 extending from a first end of the fixing portion 65, and a pushing tab 66 extending from a second end of the fixing portion 65. A flange tab 622 extends from a distal end of the positioning portion 62, and two resisting protrusions 624 extend from opposite top and bottom sides of the first end of the positioning portion 62.

The latching member 70 includes a main body 72, a locking portion 76 slidably mounted to a first end of the main body 72, and an elastic member such as a spring 78. The main body 72 defines a receiving groove 74 in a first end of the main body 72 facing the installing member 30. A fixing post 742 (shown in FIG. 4) extends into the receiving groove 74 from a sidewall 741 of the receiving groove 74. A top wall and a bottom wall of the receiving groove 74 each define a sliding hole 744. A second end of the main body 72, opposite to the first end of the main body 72, defines two fixing holes 722 in a top wall and a bottom wall of the main body 72, respectively. A hook 77 extends from a distal end of the locking portion 76. Two connecting shafts 762 extend from opposite sides of the locking portion 76. To assemble the latching member 70, the spring 78 is partially fitted about the fixing post 742. The connecting shafts 762 are engaged in the sliding holes 744, respectively, therefore, the locking portion 76 is slidably received in the receiving groove 74, with the hook 77 exposing out of the receiving groove 74. Opposite ends of the spring 78 resist against the locking portion 76 and the sidewall 741 of the receiving groove 74.

Figure 3:
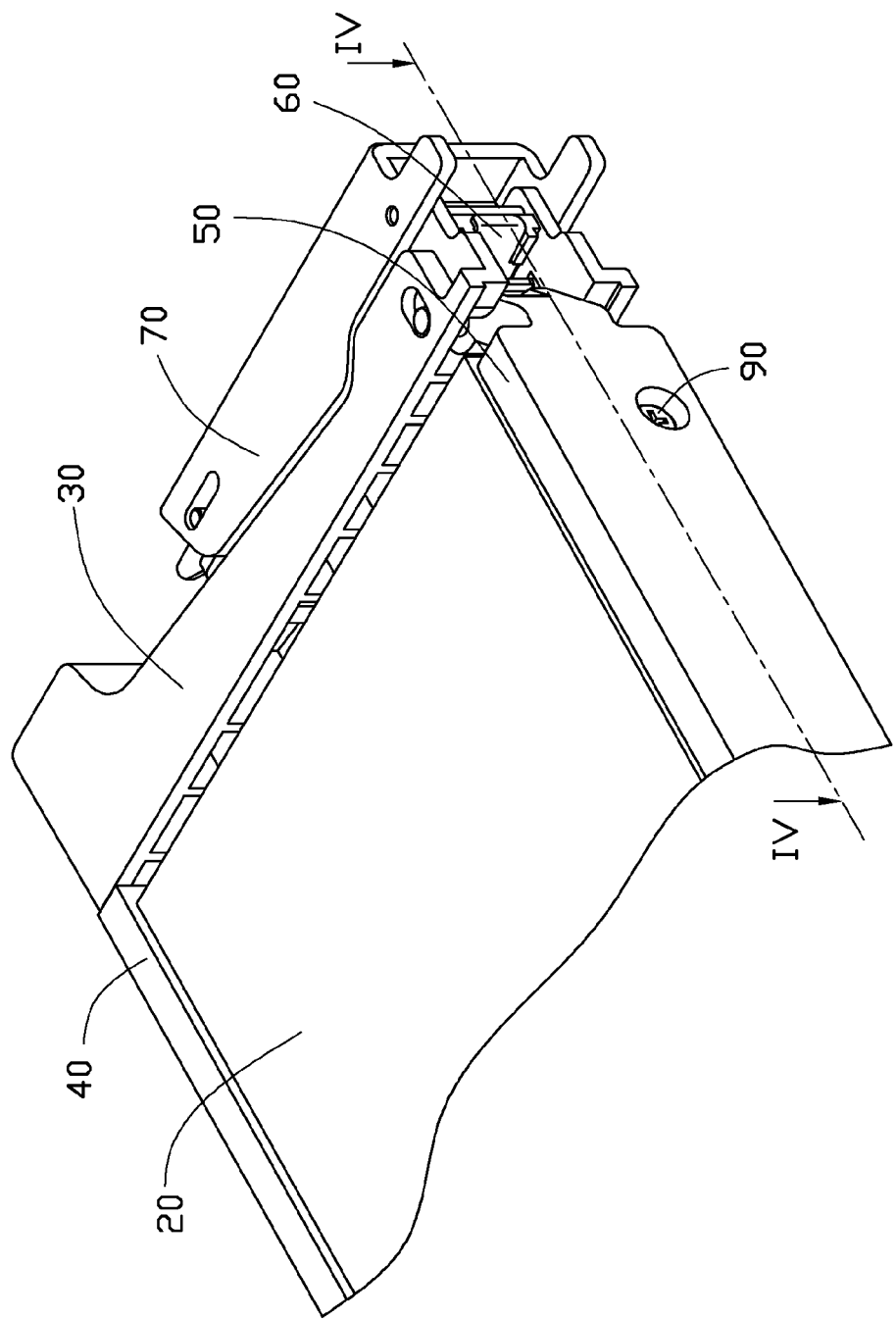
FIG. 3 is an assembled, isometric view of the mounting apparatus and the data storage device of FIG. 1, with a partial portion of the mounting apparatus and the data storage device cut away.
Figure 4:
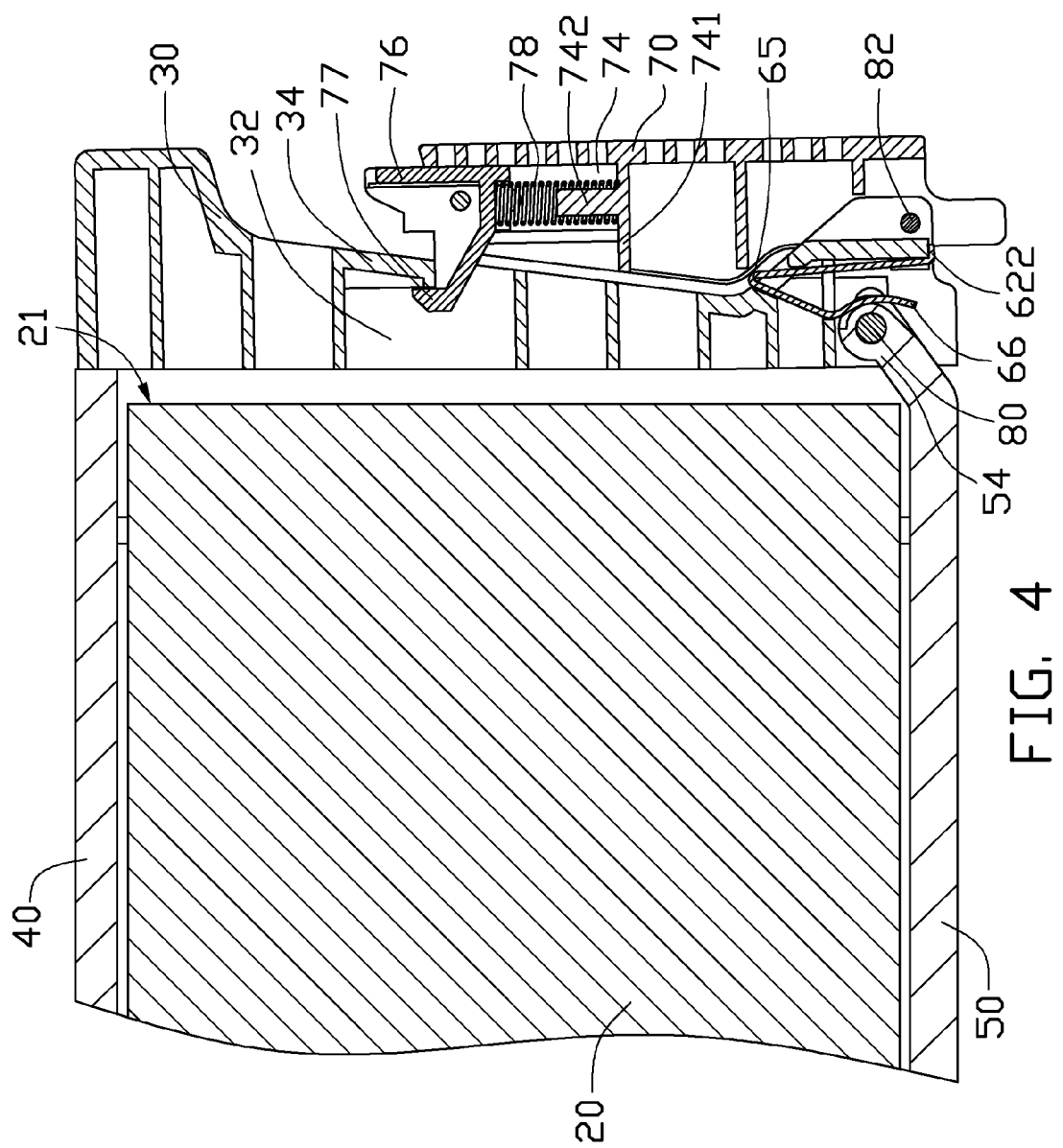
FIG. 4 is a cross-sectional view of FIG. 3, taken along the line IV-IV.

Referring to FIGS. 3 and 4, in assembly of the data storage device 20, a plurality of screws 90 are passed through the fixing holes 42 of the positioning board 40 and the fixing holes 52 of the fixing board 50, and then screwed into the fixing holes 25 of the sidewalls 24 of the data storage device 20, respectively. Therefore, the data storage device 20 is sandwiched between the positioning board 40 and the fixing board 50. The resilient member 60 is received in the receiving space 38 of the installing member 30, with the fixing portion 65 of the resilient member 60 fixedly engaging in the receiving hole 39 of the installing member 30. The flange tab 622 of the resilient member 60 resists against a distal end of the resisting side 33. The resisting protrusions 624 of the resilient member 60 resist against the protrusions 380 of the installing member 30, respectively, to prevent the resilient member 60 from disengaging from the receiving space 38.

The mounting portion 54 of the fixing board 50 is received in the receiving space 38, and the pushing tab 66 of the resilient member 60 elastically resists against the depressed region 58 of the mounting portion 54. A fixing shaft 80 is slidably passed through the sliding holes 366 of the installing member 30, and fixedly inserted into the fixing hole 56 of the mounting portion 54. Therefore, the mounting portion 54 can be moved in the receiving space 38, with the fixing shaft 80 sliding in the sliding holes 366. The second end of the installing member 30 may be fixed to the positioning board 40. The elasticity of the pushing tab 66 forces the mounting portion 54 to resist against the front side 21 of the data storage device 20, therefore, the interface 26 of the data storage device 20 is firmly connected to a circuit board of a computer (not shown).

The hook 77 of the latching member 70 is inserted into the slot 32 of the installing member 30, through a second side of the installing member 30 opposite to the data storage device 20. In this process, the spring 78 is deformed, and then the spring 78 is released to move the hook 77 to clamp with the clamping block 34 of the installing member 30. A fixing shaft 82 is fixedly engaged in the fixing holes 722 and 364 of the latching member 70 and the installing member 30. Therefore, the latching member 70 is fixed to the installing member 30. A distal end of the latching member 70, neighboring the fixing holes 722 is fixed to a bracket (not shown) of the computer.

During vibration of the data storage device 20, the data storage device 20 is moved towards the installing member 30, together with the fixing board 50. Therefore, the fixing shaft 80 is moved in the sliding holes 366 of the installing member 30. The mounting portion 54 of the fixing board 50 is moved in the receiving space 38 of the installing member 30 to deform the resilient member 60, which may prevent the front side 21 of the data storage device 20 from hitting the first side of the installing member 30. In additional, elasticity of the resilient member 60 can absorb or cushion impact or vibration of the data storage device 20.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for a data storage device, the data storage device comprising opposite sidewalls, the mounting apparatus comprising:
   an installing member defining a receiving space; and
   a fixing board fixed to one of the sidewalls, a mounting portion extending from an end of the fixing board to be slidably received in the receiving space of the installing member; and
   a resilient member mounted to the installing member, to elastically resist against the mounting portion of the fixing board, wherein the installing member defines a receiving hole communicating with the receiving space, the resilient member comprises a V-shaped fixing portion fixedly received in the receiving hole.

2. The mounting apparatus of claim 1, further comprising a fixing shaft, wherein opposite sidewalls of the receiving space each define a sliding hole, communicating with the receiving space, the mounting portion defines a fixing hole, the fixing shaft is passed through the sliding holes, and engaged in the fixing hole, the fixing shaft can be slid in the sliding holes.

3. The mounting apparatus of claim 1, wherein the resilient member further comprises a pushing tab extending from the fixing portion, the pushing tab is received in the receiving space, a depressed region is defined in a circumference of the mounting portion, the pushing tab elastically resists against the depressed region of the mounting portion.

4. The mounting apparatus of claim 3, wherein the installing member further defines two sliding holes communicating with the receiving space, the mounting portion is slidably mounted to the installing member via a fixing shaft slidably passing through the sliding holes, and engaged with the mounting portion.

5. The mounting apparatus of claim 1, wherein the resilient member further comprises a positioning portion extending from the fixing portion, a flange tab extends from a distal end of the positioning portion, the receiving space comprises a resisting side, the flange tab is resisted against a distal end of the resisting side.

6. The mounting apparatus of claim 5, wherein two protrusions extend into the receiving space from the resisting side, two resisting protrusions extend from opposite sides of the positioning portion, the resisting protrusions resist against the protrusions, respectively.

7. The mounting apparatus of claim 1, further comprises a fixing shaft, and a latching member fixed to the installing member, wherein the latching member defines two fixing holes, two opposite fixing tabs extend from the installing member, opposite to the receiving space, each fixing tab defines a fixing hole, the fixing shaft is fixedly engaged in the fixing holes of the latching member and the fixing tabs.

8. The mounting apparatus of claim 7, wherein the latching member comprises a main body defining a receiving groove, a locking portion slidably mounted to the receiving groove, and an elastic member, a fixing post extends into the receiving groove from a sidewall of the receiving groove, the elastic member is fitted about the fixing post, and opposite ends of the elastic member resist against the locking portion and the sidewall of the receiving groove.

9. The mounting apparatus of claim 8, wherein the installing member defines a slot, a hook extends from a distal end of the locking portion, to be operable of engaging in the slot of the installing member.

10. A mounting apparatus for a data storage device, the data storage device comprising opposite sidewalls, the mounting apparatus comprising:
    a fixing board fixed to one of the sidewalls, a column-shaped mounting portion extending from an end of the fixing board;
    an installing member defining a receiving space, and two opposite sliding holes communicating with the receiving space; wherein the mounting portion is received in the receiving space, and slidably mounted to the sliding holes; and
    a resilient member fixed to the installing member, and elastically resisting against the mounting portion, wherein the installing member defines a receiving hole communicating with the receiving space, the resilient member comprises a V-shaped fixing portion fixedly received in the receiving hole;
    wherein when the data storage device is moved towards the installing member, together with the fixing board, due to shock of the data storage device, the mounting portion is slid in the receiving space along the sliding holes, to hit and deform the resilient member.

11. The mounting apparatus of claim 10, further comprising a fixing shaft, wherein the sliding holes are defined in opposite sidewalls of the receiving space, respectively, the mounting portion defines a fixing hole aligned with the sliding holes, the fixing shaft is slidably passed through the sliding holes, and engaged in the fixing hole.

12. The mounting apparatus of claim 10, wherein the resilient member further comprises a pushing tab extending from the fixing portion, the pushing tab is received in the receiving space, a depressed region is defined in a circumference of the mounting portion, the pushing tab elastically resists against the depressed region of the mounting portion.

13. The mounting apparatus of claim 10, wherein the resilient member further comprises a positioning portion extending from the fixing portion, a flange tab extends from a distal end of the positioning portion, the receiving space comprises a resisting side, the flange tab is resisted against the resisting side.

14. The mounting apparatus of claim 13, wherein two protrusions separately extend into the receiving space from the resisting side, two resisting protrusions extend from opposite sides of the positioning portion, the resisting protrusions resist against the protrusions, respectively.

15. The mounting apparatus of claim 10, further comprises a fixing shaft, and a latching member fixed to the installing member, wherein the latching member defines two fixing holes, two opposite fixing tabs extend from the installing member, opposite to the receiving space, each fixing tab defines a fixing hole, the fixing shaft is fixedly engaged in the fixing holes of the latching member and the fixing tabs.

16. The mounting apparatus of claim 15, wherein the latching member comprises a main body defining a receiving groove, a locking portion slidably mounted to the receiving groove, and an elastic member elastically with opposite ends resisting against the locking portion and the sidewall of the receiving groove.

17. The mounting apparatus of claim 16, wherein the installing member defines a slot, a hook extends from a distal end of the locking portion, to be operable of engaging in the slot.

* * * * *